Dec. 23, 1969     S. E. PROCTOR     3,485,533

CUTTER PICKS

Filed Jan. 29, 1968     6 Sheets-Sheet 1

Dec. 23, 1969     S. E. PROCTOR     3,485,533
CUTTER PICKS
Filed Jan. 29, 1968     6 Sheets-Sheet 2
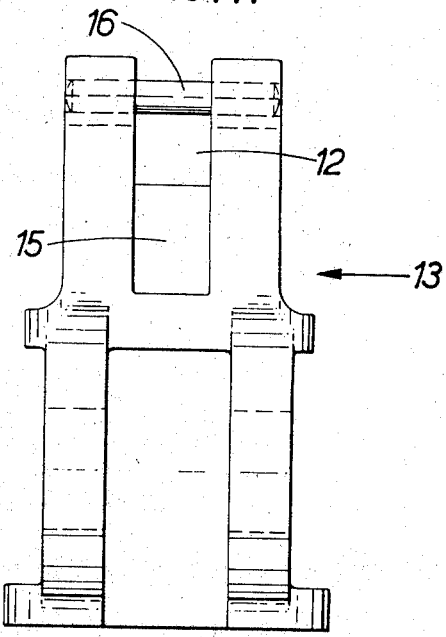
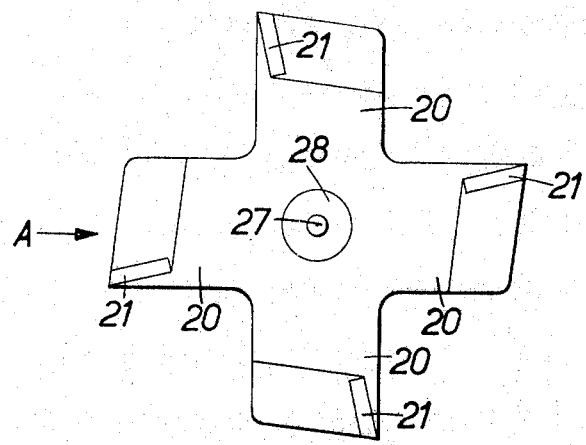
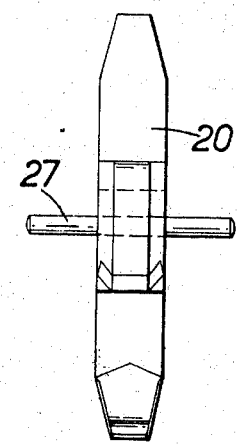

Dec. 23, 1969  S. E. PROCTOR  3,485,533
CUTTER PICKS

Filed Jan. 29, 1968  6 Sheets-Sheet 5

Dec. 23, 1969  S. E. PROCTOR  3,485,533
CUTTER PICKS

Filed Jan. 29, 1968  6 Sheets-Sheet 4

Dec. 23, 1969  S. E. PROCTOR  3,485,533
CUTTER PICKS

Filed Jan. 29, 1968  6 Sheets-Sheet 5

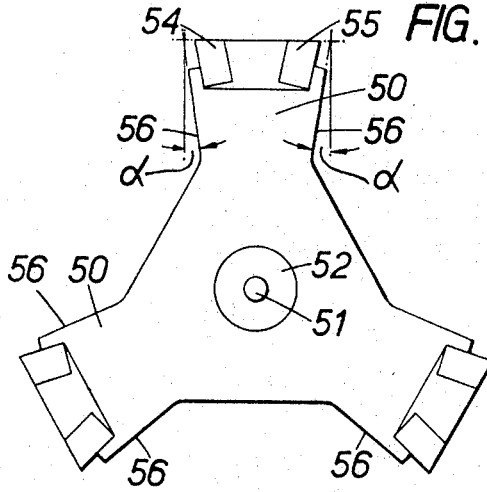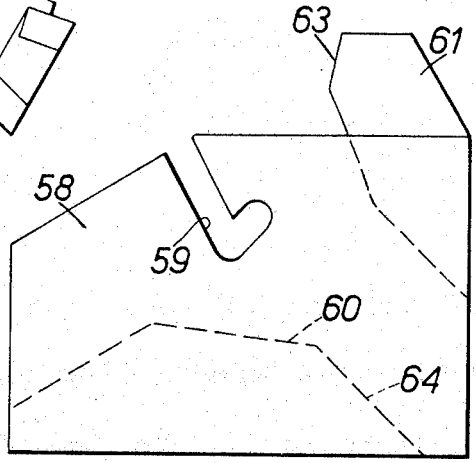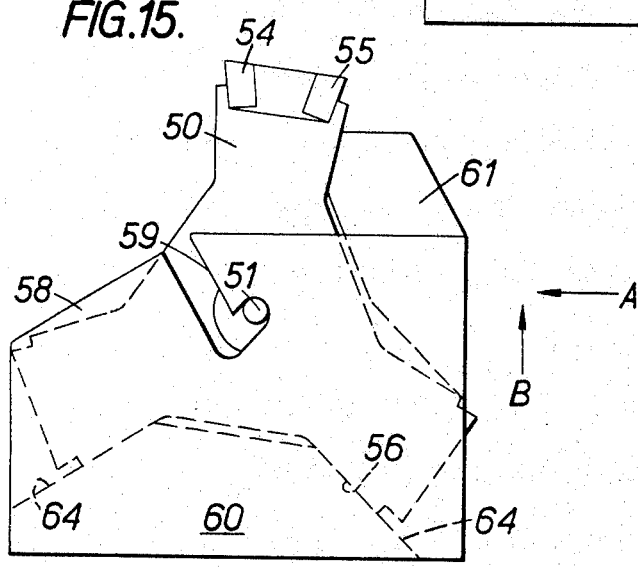

United States Patent Office 3,485,533
Patented Dec. 23, 1969

3,485,533
CUTTER PICKS
Sidney E. Proctor, High Wycombe, England, assignor to Austin Hoy and Company Limited, High Wycombe, England, a British company
Filed Jan. 29, 1968, Ser. No. 701,289
Claims priority, application Great Britain, Feb. 1, 1967, 4,977/67; Mar. 2, 1967, 10,022/67; Mar. 10, 1967, 11,489/67; Apr. 7, 1967, 16,038/67
Int. Cl. E21c *13/80*
U.S. Cl. 299—92        5 Claims

ABSTRACT OF THE DISCLOSURE

A cutter means for a mineral cutting machine in which cutter picks are driven along an endless path and comprising a cutter pick having a plurality of blades angularly spaced from one another around an axis normal to the cutting direction and a holder. The cutter pick is removably mounted in the holder with one blade projecting therefrom in a locked position. The projecting blade can be replaced by removing, rotating and remounting the cutter pick.

---

This invention is concerned with cutter picks of the kind used in cutting minerals and particularly, but not exclusively, in coal mining, and comprising a blade with a cutter tip, usually in the form of an insert of hard material, e.g. tungsten carbide, and in use are mounted in a holder which is adapted to be secured to, or formed integrally with, a chain, drum or other carrier.

The present invention provides a cutter pick of the kind referred to having two, three or four blades which are preferably equi-angularly displaced round an axis perpendicular to the cutting direction.

The blades can therefore be used in turn, i.e. with a pick having three symmetrically disposed blades, when one cutter tip is worn the pick can be rotated through 120° to use another tip. Thus a measure of economy is obtained in the manufacture of the pick.

If desired the blades may be of different lengths. Thereby means is provided for gauging the pick (i.e. varying the distance of the cutting tip from the pick holder or box).

Preferably the blades are flat and lie in a plane normal to said axis.

Any suitable holder or box may be used for a pick in accordance with the invention.

The present invention also provides a holder for a three bladed pick in accordance with the invention, which holder or box has a slot with an inverted V-shaped bottom adapted to fit between two blades of the pick while the third blade projects from the slot.

Any suitable means may be provided for retaining the pick in the holder or box.

The present invention further provides a holder for a two or four bladed pick in accordance with the invention, which holder has a slot and a pair of abutments which are spaced apart to receive therebetween one of the blades of the pick when the pick is mounted in the slot with anothr of the blades projecting from the slot.

The abutments may be formed by a pair of shoulders on opposite sides of a hole opening into the slot, the hole being shaped to receive the pick blades one at a time. The hole may extend at right angles to the slot.

The present invention still further provides a cutter pick holder having a recess shaped to receive a pick having a plurality of blades in any of a plurality of different positions of the pick relative to the holder, and a latch mounted in the holder and resiliently engagable with the pick for retaining the pick in the holder.

The recess may be formed as a slot, which may be bridged by an abutment for supporting the pick when in use. The latch may extend transversely of the slot, for example at the bottom of the slot, or may have an end projecting into the slot. Moreover, the latch may be mounted in elastomeric material in the holder and may be in the form of a pin.

The present invention further provides a pick for use in the holder according to the invention, the pick having a plurality of blades and a plurality of recesses for engagement with the latch.

The invention further provides the combination of a pick and a holder as hereinbefore set out.

The present invention moreover provides in combination a cutter pick and a pick holder, the cutter pick having a blade provided with two cutter tips and the pick holder being arranged to hold the cutter pick with either of the cutter tips in a cutting position forward of the other cutter pick, with reference to the cutting direction, and with the cutter tip in the cutting position disposed further from the pick holder, in a direction transverse to the cutting direction, than said other cutter tip.

The present invention further provides in combination a cutter pick and a pick holder, the cutter pick having a plurality of blades each provided with two cutter tips and the pick holder being arranged to hold the cutter pick with any one of the cutter tips in a cutting position forward of the other cutter tip on the same blade and disposed further from the pick holder, in a direction transverse to the cutting direction, than said other cutter tip.

Each of the blades may be formed with opposite faces which converge away from the cutter tips for co-operation with faces on the pick holder, and one of said faces on the pick holder may be an abutment face on a backstop forming part of the pick holder. The faces of the holder may be disposed so that when the cutter pick is held in the pick holder with one of the faces on one of the blades against the abutment face, the face on the opposite side of said blade extends perpendicular to the cutting direction. The pick holder may be formed with a recess for receiving the cutter pick, two of said faces of the holder being formed on the bottom of the recess for surface to surface contact with two other blades of the pick.

The following is a description, by way of example, of various embodiments of the present invention, reference being made to the accompanying drawings, in which:

FIG. 4 is a front view of the box of FIG. 3;

FIG. 5 shows a side view of a four-bladed coal-cutter pick;

FIG. 6 shows a broken-away view of the pick taken in the direction of arrow A of FIG. 5;

FIG. 13 shows a side view of a three-bladed cutter pick;

FIG. 14 shows a side view of the pick holder; and

FIG. 15 shows a side view of the cutter pick of FIG. 13 held in the pick hollow of FIG. 14.

Figure 1:
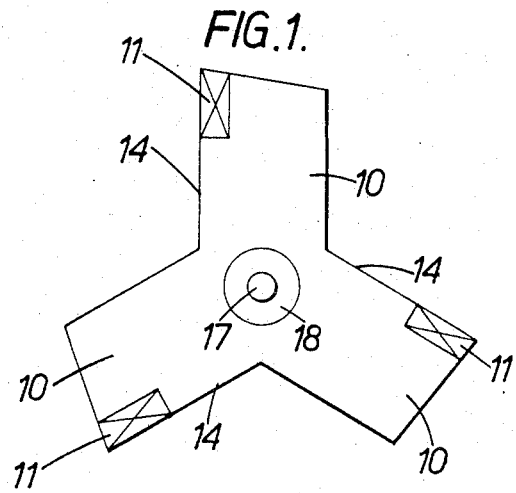
FIG. 1 is a side view of a coal-cutter pick in accordance with the invention.
Figure 2:
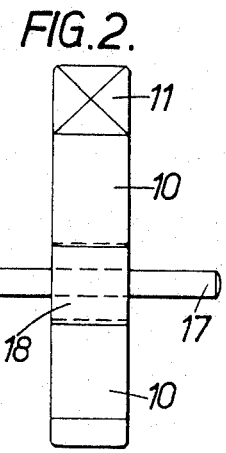
FIG. 2 is a front view of the pick.
Figure 3:
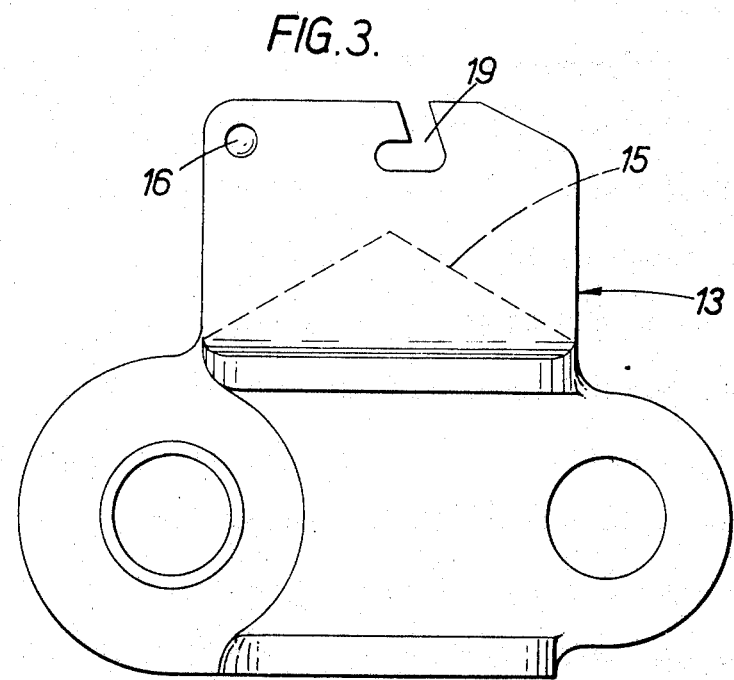
FIG. 3 is a side view of a pick box in accordance with the invention for the pick of FIGS. 1 and 2.

Referring to FIGS. 1 to 4 of the drawings, a coal-cutter pick comprises three flat blades 10 of equal length equi-angularly displaced from each other around an axis normal to the cutting direction. The blades lie in a plane normal to said axis and each blade is provided with a tungsten carbide insert 11 at its cutting tip. In use, two of the blades are inoperative (as far as cutting is concerned) and lie in a slot 12 in a coal-cutter chain box 13. The base of the slot is machined to form an inverted V-shaped boss 15 with an included angle of 120°. The leading edge 14 of each blade 10 is machined to provide a flat face for contact with the boss 15, which fits between the two blades in the slot. The other blade projects from the slot for use in cutting. A stop pin 16 extends across the slot 12 to one side of the boss 15 so as to be engageable by a trailing edge of a blade 10 in the slot and prevent backward movement of the pick when in operation. The pick has a latch formed by a cross-pin 17 mounted in a bush 18 of rubber or other elastomeric material in a central bore in the pick. The cross-pin 17 fits into two bayonet type slots 19 in opposite walls of the box 13 so as to hold the pick resiliently down in the box. Other pick-retaining means may be used if desired.

It will be seen that any desired cutting tip can be used and that the pick can when desired be removed from the holder and replaced with another blade arranged for cutting. The three blades may be of different lengths so that it is possible to gauge the pick.

The coal-cutter pick of FIGS. 5 and 6 has four blades 20 of equal lengths equi-angularly spaced from each other about an axis perpendicular to the cutting direction. The blades 20 lie in a plane perpendicular to the cutting direction and each blade 20 is provided with a tungsten carbide insert 21 at its tip.

Figure 7:
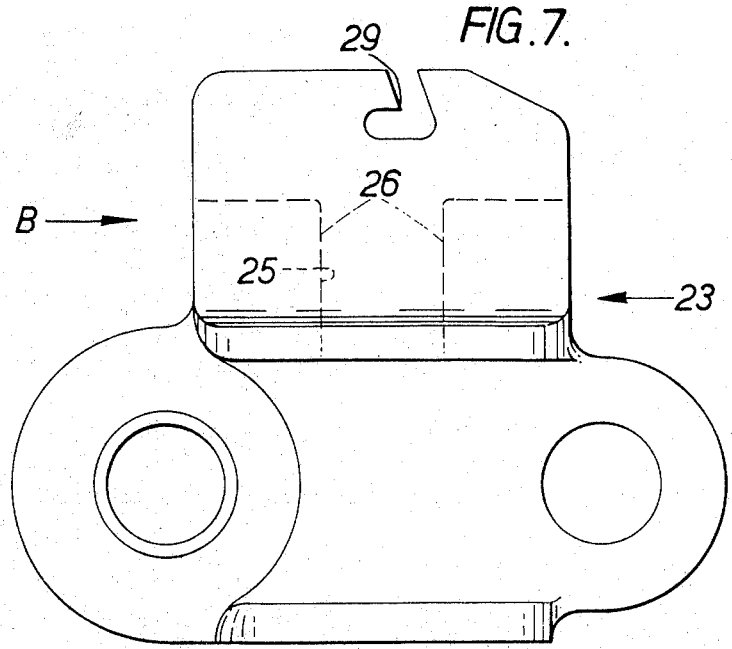
FIG. 7 shows a side view of pick box for use with the pick of FIGS. 5 and 6.
Figure 8:
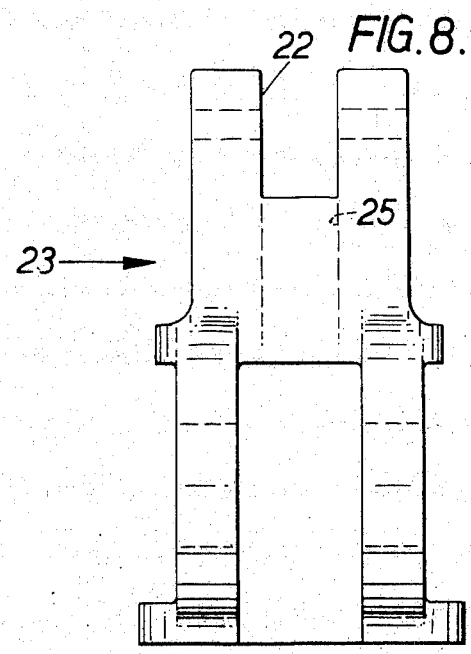
FIG. 8 shows a broken-away view taken in the direction of arrow B of FIG. 7.

The pick holder shown in FIGS. 7 and 8 has a slot 22 milled in a coal-cutter chain box 23, and a pick hole 25 is broached in the box 23, the pick hole 25 opening at right angles into the bottom of the slot 22 and having on opposite sides of the pick hole 25 a pair of abutments in the form of shoulders 26.

The pick hole 25 is shaped to receive the blades 20 one at a time, so that when the pick is inserted into the box 23, one blade 20 is received between the shoulders 26, the two adjacent blades 20 extend along the slot 22 and the fourth blade 20 projects from the slot 22 for use in cutting. The pick has a latch formed by a cross-pin 27 mounted in a bush 28 of rubber of other elastomeric material in a central bore in the pick, and the cross-pin 27 fits into two bayonet type slots 29 in opposite walls of the slot 22 to hold the pick resiliently in the box 23.

By removing the pick from the box 23, rotating the pick and replacing the pick in the box 23, any one of the four blades 20 can be positioned to project from the slot 22 for coal cutting. After the pick is fitted into the box 23, the engagement of one of the blades 20 in the pick hole 25 prevents rotation of the pick relative to the box 23.

Instead of the four-bladed pick shown in FIGS. 5 and 6, a two-bladed pick may be employed. Moreover, the blades may have different lengths to provide for gauging the pick.

The two-bladed pick may be made by omitting one of the blades of the three-bladed pick described above or two adjacent or opposite blades of the pick shown in FIGS. 5 and 6. There are thus several permutations for the cutting edges of the three and four blade picks.

Figure 9:
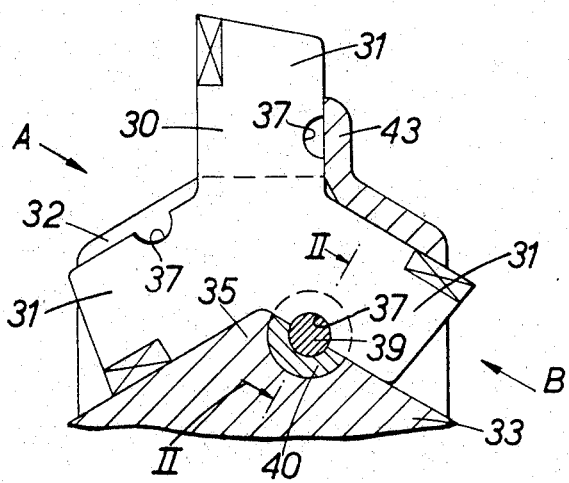
FIG. 9 shows a partial side view, in section, of another cutter pick in a cutter pick holder.

As shown in FIG. 9, a cutter pick 30 having three blades 31 is mounted in a slot 32 in a holder in the form of a coal-cutter chain box 33. The blades 31 are equi-angularly spaced around an axis extending normal to the cutting direction, and lie in a plane normal to said axis. The base of the slot 32 is machined to form an inverted V-shaped boss 35 with an included angle of 120°.

Each blade 31 is formed with a recess 37 on its trailing edge so that when the pick 30 is inserted into the box 33 a latch pin 39 extending transversely of the slot 32 at the bottom of the slot 32 can engage, as shown in FIG. 1, in one of the recesses 37 for retaining the pick 30 in the box 33.

The latch pin 39 is mounted in a bush 40 of neoprene or other elastomeric material, the bush 39 being cut away at 42 (FIG. 10) to the width of the slot 32.

An abutment 43 bridging the slot 32 forms a stop for supporting the pick 30 when in use. On insertion of the pick 30, any one of the blades 31 is pushed in the direction of arrow A into the slot 32 beneath the abutment 43 and depresses the latch pin 39 into the bush 40 until another of the blades 31 reaches the abutment 43, whereupon the latch pin 39 engages in the recess 37.

For removing the pick 30 from the box 33, an extractor (not shown) is engaged with the box 33 and is swivelled to press the pick 30 from the box 33 in the direction of arrow B.

Figure 10:
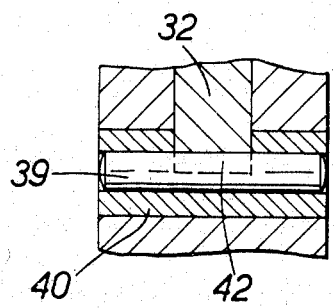
FIG. 10 shows a partial view of the holder taken in section along the line II—II of FIG. 9.
Figure 11:
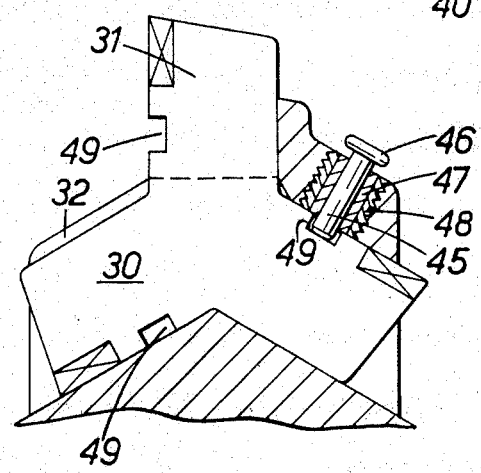
FIG. 11 shows a partial side view, in section, of a further cutter pick and cutter pick holder.

In FIG. 11, a pick and a cutter box are shown having some features which are the same as those shown in FIGS. 9 and 10, and which are indicated by the same reference numerals. However, the cutter box of FIG. 11, instead of the retainer pin 39, has a latch in the form of a plunger pin 45 having an end projecting into the slot 32 and having a head 46. The plunger pin 45 is held in a bush 47 of moulded rubber or other elastomeric material, which in turn is held in a metal bush 48 in threaded engagement with the box 33.

Instead of the recesses 37 of FIG. 9, the pick of FIG. 11 is formed with slots 49 which are engageable by the end of the plunger pin 45 projecting into the slot 32. To insert the pick, a claw type extractor (not shown) is engaged beneath the head 46 to retract the plunger pin 45 from the slot 32, and this extractor is similarly used to enable removal of the pick.

In a further embodiment of the invention, which is not shown in the drawings, a cutter pick holder having a recess shaped to receive a pick having a plurality of blades in any of the plurality of different positions is provided with a latch which is housed in a first bore for movement between a latched position, at which the latch projects from an inner face on the holder for engagement in a complementary recess in the pick, and an unlatched position at which the latch is retracted from the recess, a second bore in the holder intersecting the first bore and a resilient member in the form of a solid block in the second bore and co-operating with the latch constantly to urge the latch towards the latched position, which resilient member is stressed when the latch is retracted.

Figure 12:
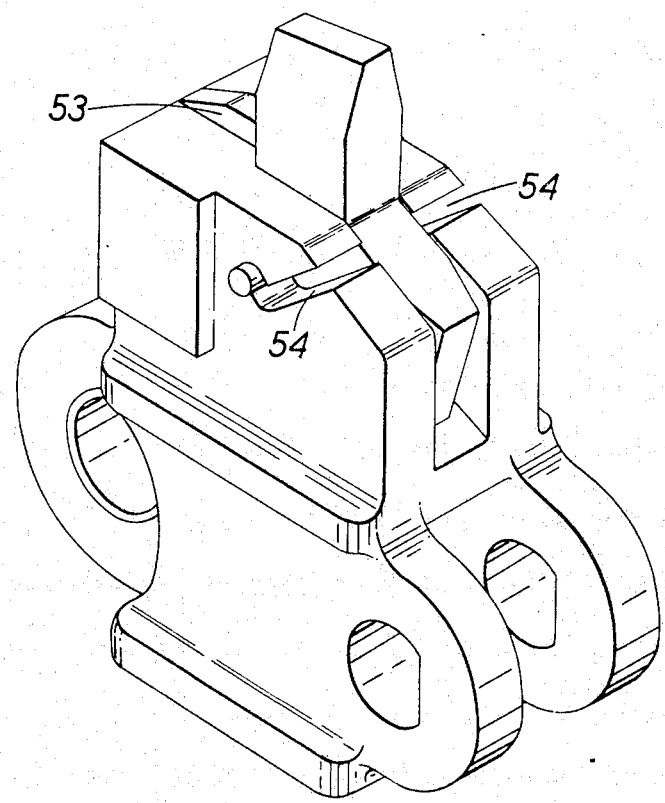
FIG. 12 shows a further cutter pick and cutter pick holder in perspective.

The cutter pick and cutter pick holder or box shown in FIG. 12 are modifications of those shown in FIGS. 1 to 4 and differ therefrom in that, instead of a stop pin extending transversely across the slot in the pick holder so as to be engageable by a trailing edge of one of the blades of a pick retained by resilient engagement of a cross-pin on the pick in bayonet-type slots in the holder, the pick holder shown in FIG. 12 has an abutment 53 corresponding to the above-described abutment 43 and forming a back-stop for the pick in use. Moreover, the holder shown in FIG. 12 has bayonet-type slots 54 which differ from those shown in FIGS. 1 to 4 of the drawings and which each have two arms both inclined to the cutting direction instead of one inclined arm and one horizontal arm.

The cutter pick shown in FIG. 13 has three blades 50 equi-angularly spaced about the axis of a cross-pin 51 which is mounted in a bush 52 of rubber or other elastomeric material, the cross-pin 51 projecting from opposite sides of the cutter pick.

Two cutter tips 54 and 55 are inset in the end of each of the arms 50, which have opposite faces 56 converging away from the cutter tips 54 and 55, the faces 56 subtending angles $\alpha = 7°$ with planes parallel to the lonigtudinal axes of the blades 50.

As shown in FIG. 14, the pick holder is in the form of a pick box having opposite side walls 58, only one of which is shown and which are each formed with a bayonet-type slot 59. The pick box is machined to provide a recess bounded by the side walls 58, a boss 60 and a backstop 61 bridging the space between the side walls 58.

The backstop 61 has an abutment face 63 for surface to surface contact with one of the faces 56 of the cutter pick, and the boss 60 is formed with abutment faces 64 at the bottom of the recess for surface to surface contact with two others of the faces 56 as shown in FIG. 15. The faces 63 and 64 are disposed so that the cutter pick can be held in the pick box with any one of the cutter tips 54 and 55 in a cutting position forward of the other cutter tip on the same blade 50 and disposed further from the pick box, in a direction B transverse to the cutting direction A, than this other cutting tip. As shown in FIG. 15, the cutter tip indicated in that figure by reference numeral 54 is in the cutting position, and is disposed further from the pick box in the direction B than the cutter tip 54 in FIG. 18, thus avoiding damage to the latter during use.

When the cutter pick is thus fitted in the pick box, the cross-pin 51 engages in the slots 59 and that blade face 56 which is on the opposite side to the abutment face 63 of of the blade 50 bearing against the abutment face 63 extends perpendicular to the cutting direction A.

It will be apparent that when the cutter tip in the cutting position becomes worn, the cutter pick is removed from the cutter box and then replaced therein with any one of the five other cutter tips in the cutting position.

Instead of employing a bayonet type connection, the cutter pick may be retained in the cutter box by a latch on the cutter box engaging in the cutter pick, e.g. as described with reference to FIGS. 9 to 12.

I claim:
1. In a cutting means for a mineral cutter machine of the kind in which cutter picks are driven along an endless path, and in which the cutting means comprise a holder and a cutter pick removably mounted in the holder and having at least three blades with cutter tips, which blades are angularly spaced from one another round an axis normal to the cutting direction, whereby the pick can be mounted with any desired one of the blades projecting in an operative position from the holder, the improvement consisting of a parallel-sided pick, and locating means on the holder comprising a parallel-sided slot in which the pick is supported, the bottom of the slot being shaped to fit between adjacent inoperative blades and in contact with the adjacent converging sides of those blades.

2. A cutting means according to claim 1 wherein the pick has three equi-angularly spaced blades and the holder has a single locating means fitting between the two inoperative blades.

3. A cutting means according to claim 1 wherein the pick has four equi-angularly spaced blades and the holder has two locating means fitting between the three inoperative blades.

4. A cutting means according to claim 1 wherein the locating means further comprises a supporting abutment engaging the rear side of an operative blade of the pick.

5. A cutting means according to claim 1 wherein a resilient latch is provided holding the locating means and said inoperative blades in engagement.

References Cited
UNITED STATES PATENTS

| | | | |
|---|---|---|---|
| 1,782,172 | 11/1930 | Levin | 299—93 |
| 2,123,213 | 7/1938 | Simmons | 299—93 |
| 2,168,794 | 8/1939 | Fulke | 299—92 |
| 2,183,581 | 12/1939 | Osgood | 299—93 |
| 2,590,053 | 3/1952 | Taylor | 175—383 |
| 3,021,124 | 2/1962 | Bowen | 299—92 X |
| 3,148,002 | 9/1964 | Krekeler | 299—92 |
| 3,330,601 | 7/1967 | Proctor | 299—92 |

ERNEST R. PURSER, Primary Examiner

U.S. Cl. X.R.
175—383